Oct. 8, 1929.  H. V. LAWLEY  1,730,939

PHOTOGRAPHIC PRINTING APPARATUS

Filed July 29, 1924    6 Sheets-Sheet 1

INVENTOR
HENRY VASSAR LAWLEY.
BY R. L. Stinchfield
ATTORNEY

INVENTOR
HENRY VASSAR LAWLEY.
BY R. L. Stinchfield
ATTORNEY

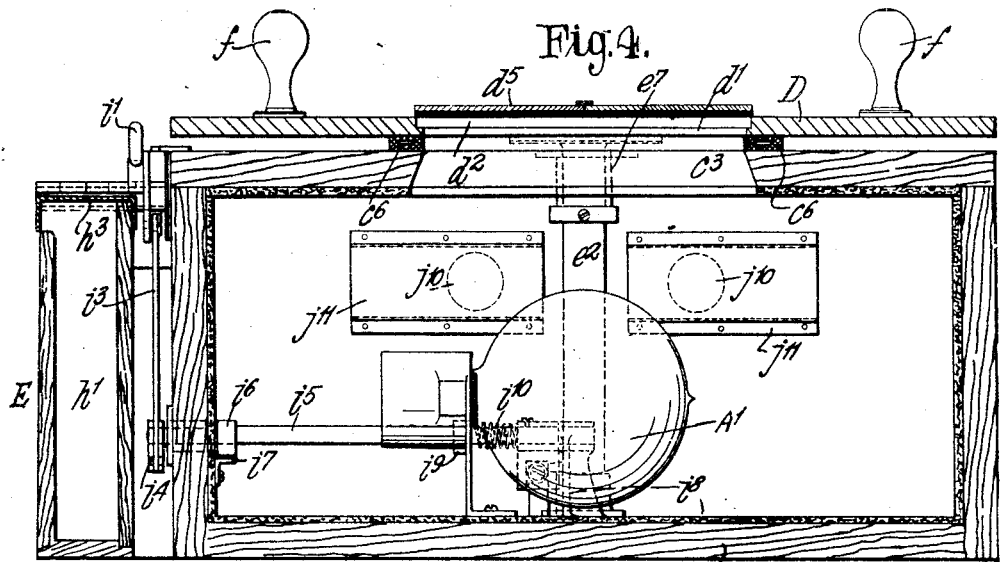
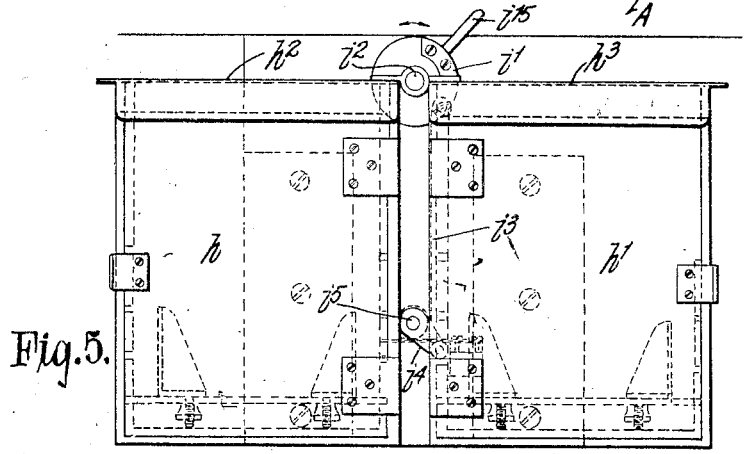
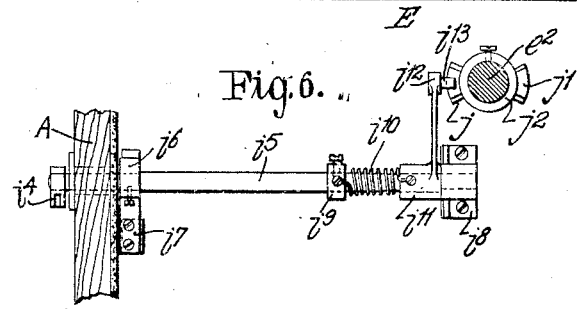

Oct. 8, 1929. H. V. LAWLEY 1,730,939
PHOTOGRAPHIC PRINTING APPARATUS
Filed July 29, 1924 6 Sheets-Sheet 4

INVENTOR
HENRY VASSAR LAWLEY.
BY R. L. Stinchfield
ATTORNEY

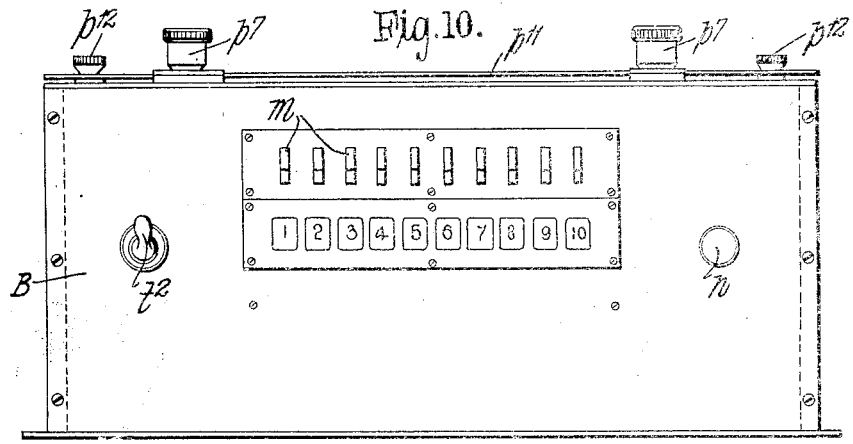
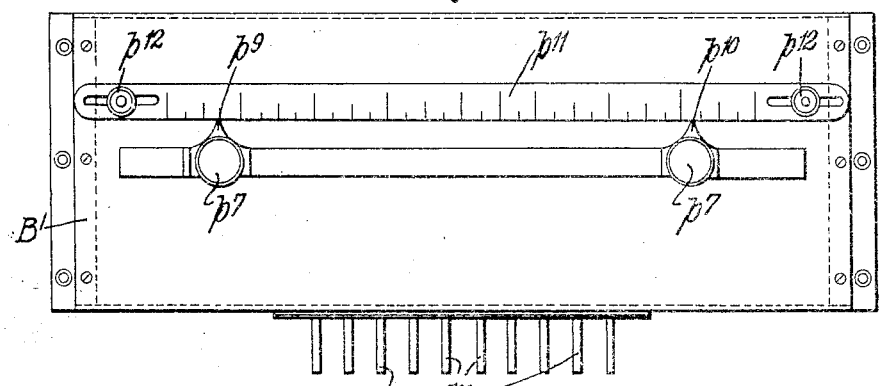
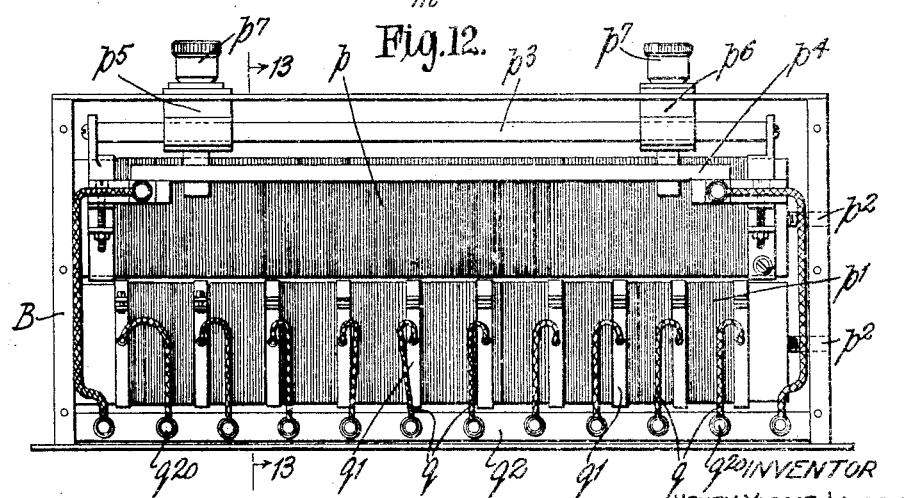

Patented Oct. 8, 1929

1,730,939

UNITED STATES PATENT OFFICE

HENRY VASSAR LAWLEY, OF LONDON, ENGLAND

PHOTOGRAPHIC PRINTING APPARATUS

Application filed July 29, 1924, Serial No. 728,978, and in Great Britain January 1, 1924.

This invention relates to photographic printing apparatus and the object is to provide a simple apparatus by which the printing may be expeditiously and efficiently carried out with the provision of printing lights of proper intensity for negatives of different density according to a predetermined grading, as distinct from the usual methods in which the negatives are submitted for various periods of exposure to a printing light of constant intensity.

Figure 1:
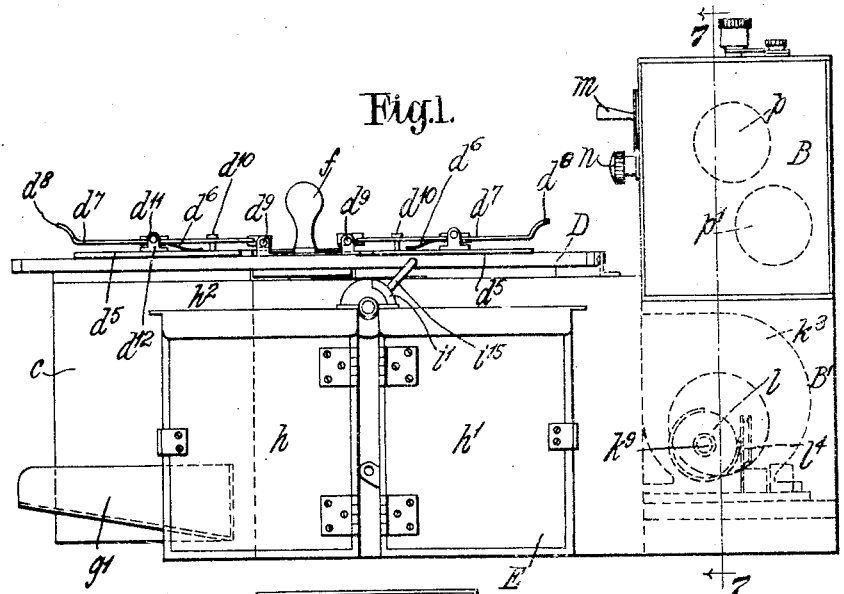
Figure 2:
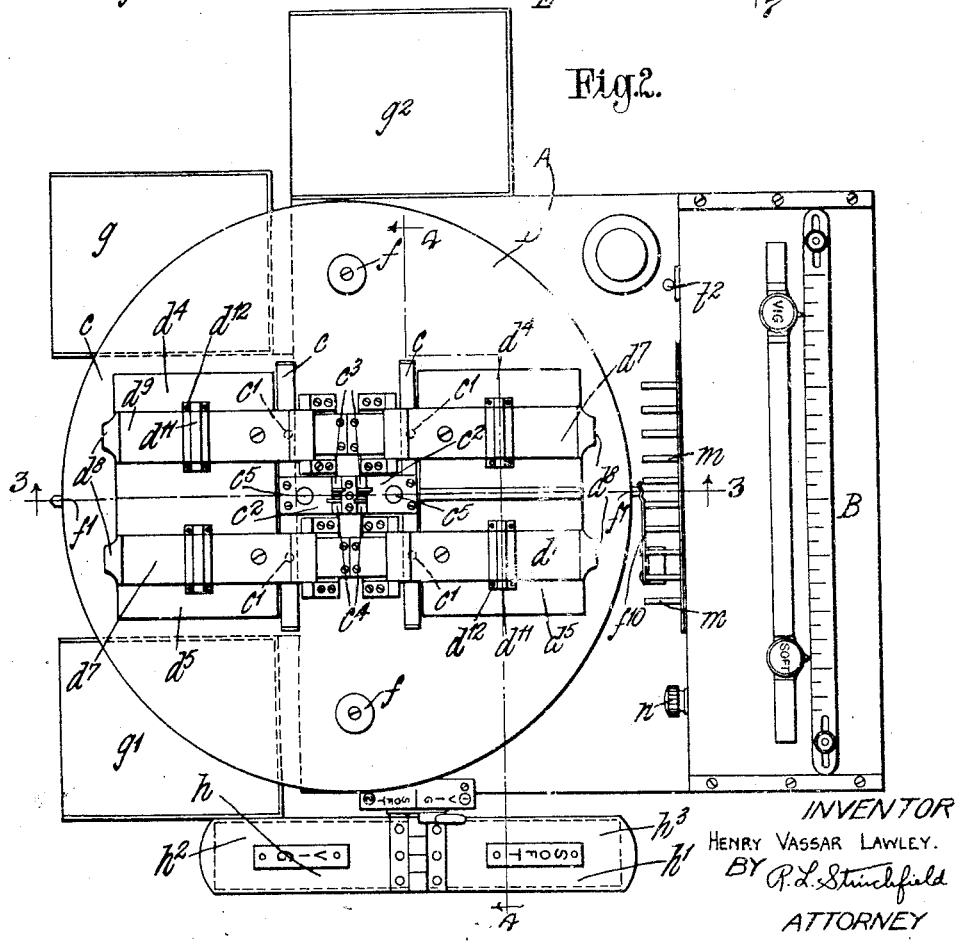
Figure 3:
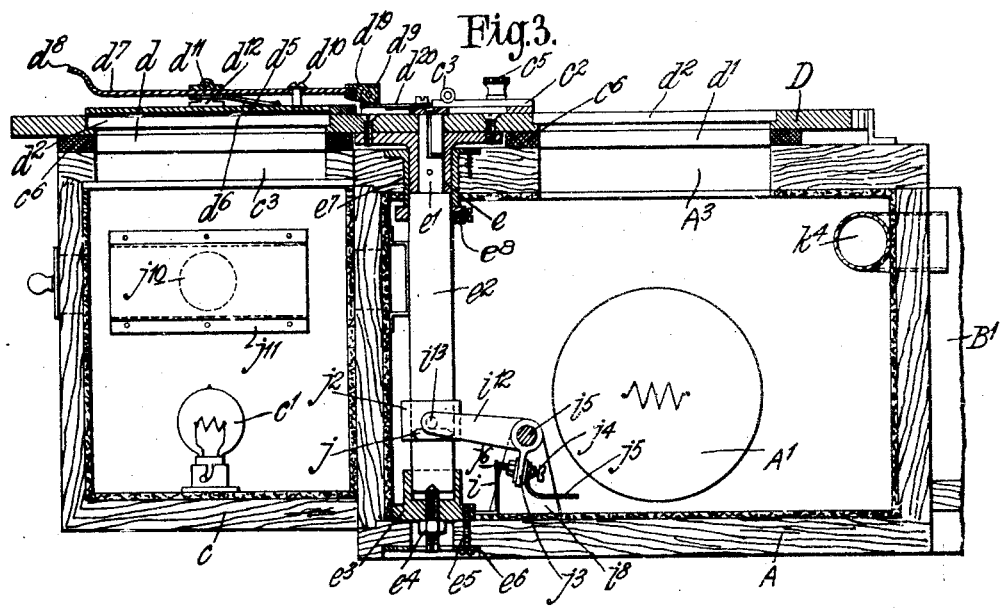
Figure 13:
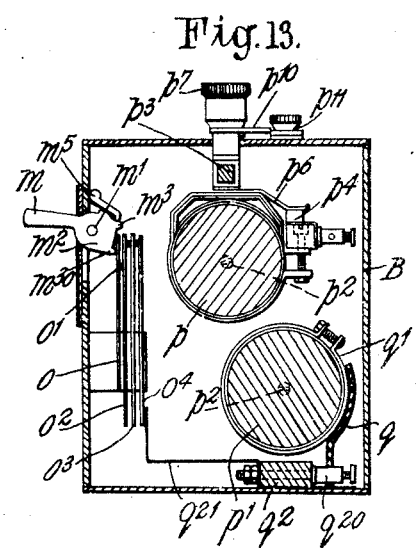
Figure 7:
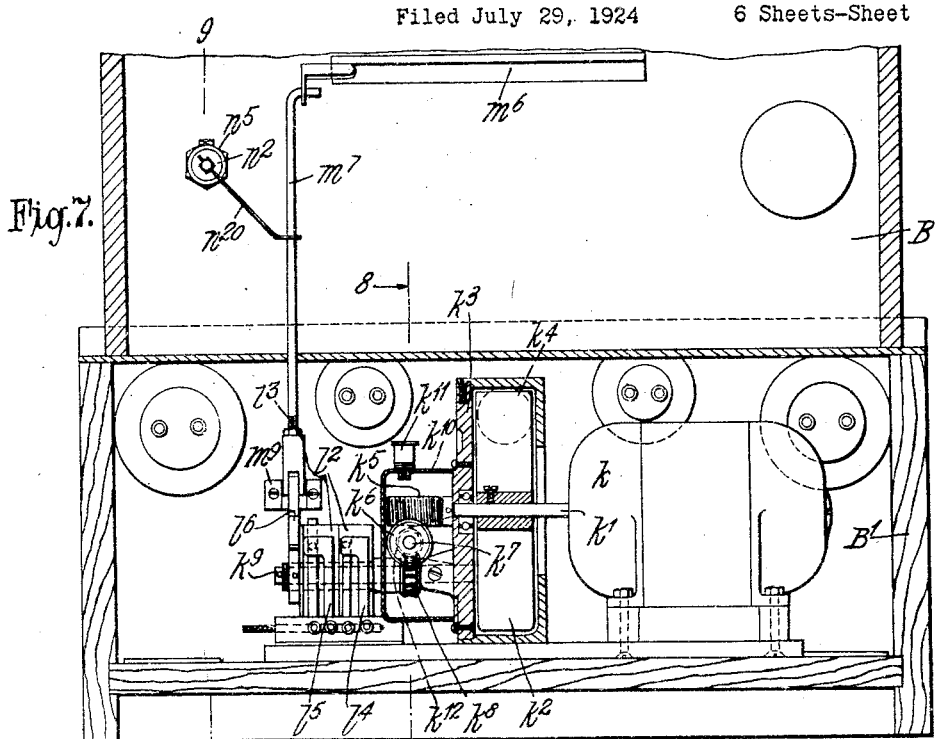
Figure 8:
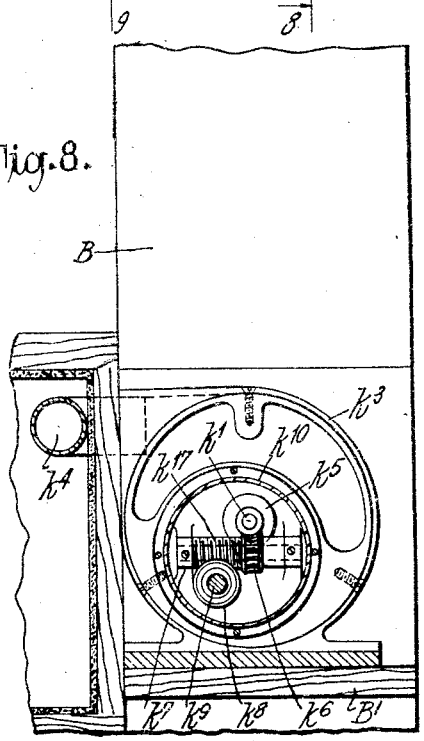
Figure 9:
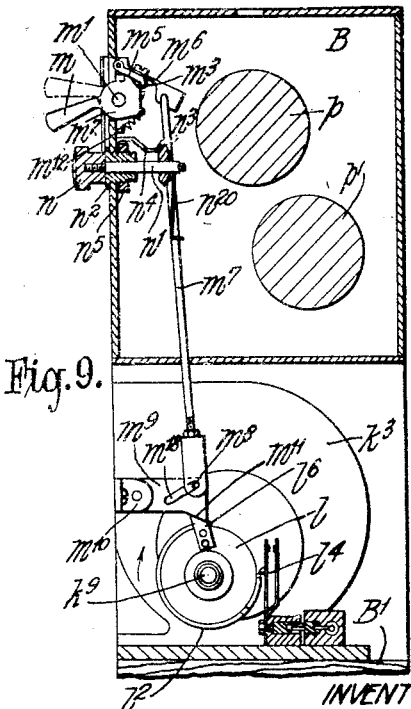
Figure 14:
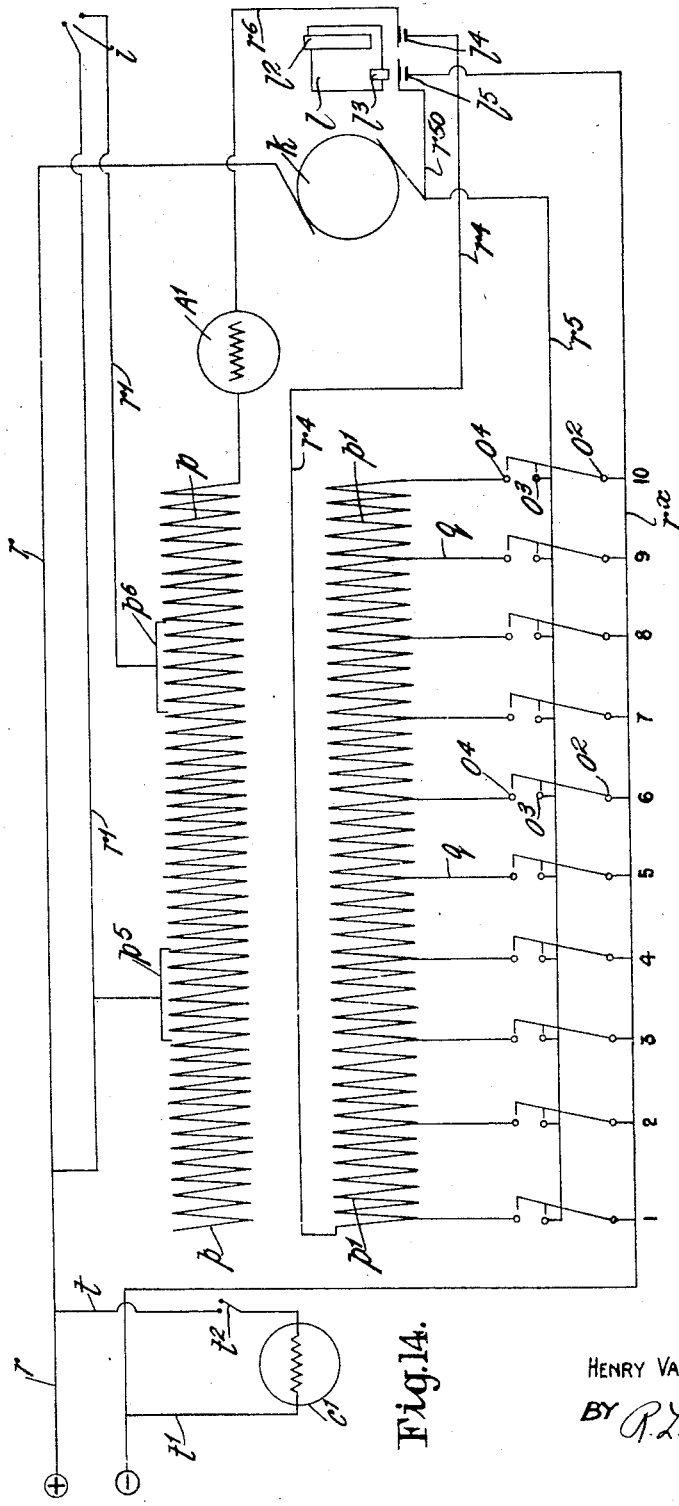

A preferred embodiment of the invention is illustrated in the accompanying drawings in which Fig. 1 is a side elevation of the printing device and an associated light controlling device. Fig. 2 is a plan view of Fig. 1. Fig. 3 is a vertical section through the printing device alone taken on the line 3—3 of Fig. 2 on a somewhat enlarged scale. Fig. 4 is a vertical section of Fig. 2 on the line 4—4 also on an enlarged scale. Fig. 5 is a side view of boxes for reception of different qualities of printing paper seen from the left of Fig. 4. Fig. 6 is a sectional view of a resistance cut-out illustrated in Fig. 4. Fig. 7 is a section through the controlling device on line 7—7 of Fig. 1 on an enlarged scale. Fig. 8 is a section on line 8—8 of Fig. 7. Fig. 9 is a section on line 9—9 of Fig. 7; Fig. 10 is a front elevation of the upper part of the controller casing showing the resistance keys. Fig. 11 is a plan view of Fig. 10 showing a device for operating a sliding variable resistance hereinafter referred to. Fig. 12 is an elevation of the light resistance devices. Fig. 13 is a section of Fig. 12 on line 13—13, and Fig. 14 is a diagram showing the circuits of the controlling device.

The mechanical features of the invention will be first detailed followed by a description of the electrical control features.

The apparatus shown more particularly in Figs. 1 to 6 of the drawings comprises a light tight casing A in which is disposed an electric printing lamp $A^1$ which (as hereinafter described) is in circuit with an intensity controlling device contained in separate casings B and $B^1$ shown in Fig. 1 as located at the right hand side of the casing A. This controlling device is of the general character described in the specification of United States Patent No. 1,435,245 whereby, according to a predetermined grading of the negative and depression of a suitable key, resistance may be cut in or out of the lamp circuit to increase or reduce the intensity of the printing light whilst, however, maintaining constant the period of illumination of the lamp.

The front wall of the casing A is hinged and to said wall is attached a further grading casing C containing a ruby or non-actinic electric lamp $C^1$ or white lamp with a non-actinic screen. The casings A and C have at their top apertures $A^3$ and $C^3$ respectively. Above the casings A and C is positioned a horizontal rotatable disc or plate D in which are two spaced or diametrically disposed glazed apertures $d$, $d^1$ and the disc is so mounted that one of said apertures as $d$ (Fig. 3) is over the grading casing C whilst the other, as $d^1$, is over the printing casing A so that whilst one negative is being printed the negative to be next printed is being graded. The said apertures are covered by glass $d^2$ above which may be placed the usual celluloid or like mask. In order to hold said mask in position there are provided bars $c$, $c$ provided with holes to take pins $c^1$ in the disc D and which pass through holes made in the mask and are pressed downwards by plates $c^2$ hinged to the disc D at $c^3$ and under the action of coiled springs $c^4$. The plates $c^2$ each have a knob $c^5$ for their manipulation. When it is desired to change the mask the plates and bars can be raised by means of the knobs $c^5$. A surround of velvet or felt $c^6$ around the apertures is also provided to prevent the escape of light into the room in which the apparatus is located. The negative is held in position over the aperture by a two part cover $d^4$, $d^5$, each part being separately held pressed resiliently in position by means of a flat spring $d^{20}$ (Fig. 3) pressing against a cam $d^{19}$ pivoted in lugs $d^9$ extending upwards from the surface of the disc D to which cam a lifting plate $d^7$ provided at its forward end with a finger piece $d^8$ is attached. The cam $d^{19}$ acts to both maintain pressure on the cover when it is lowered or maintain it in lifted position when raised. The said plate $d^7$ is the sole means of providing spring pressure to keep the printing paper in contact with the negative. In order however to provide even pressure of the cover and to permit of the use of glass plates as negatives as well as films the plate $d^7$ is mounted on the cover to rock about a pivoted point, being hinged by means of a rod $d^{11}$ in lugs $d^{12}$ upstanding from the cover. The plate $d^7$ is under pressure of a leaf spring $d^6$ and is loosely traversed by a screw $d^{10}$ screwed into the cover. The said screw $d^{10}$ and spring $d^6$ are for the purpose of preventing the cover $d^5$ from hanging loosely and swinging, the screw $d^{10}$ limiting the movement of the plate and the spring $d^6$ keeping it lightly pressed against the head of the screw. The said spring is so weak that it has no influence on the pressure exerted on the cover. When the cover $d^5$ with its pivotally attached plate $d^7$ is brought down into contact with the printing paper the cover meets the paper in parallelism therewith.

The object of the two cover members is, that after positioning the paper and negative on the mask they can be held in position by one hand, whilst the one member is brought down to clamp them after the grading has been effected.

It will be apparent also that when grading and masking by the ruby light emitted by lamp $C^1$ the negative and printing paper may be properly positioned across the aperture $d$ on the disc and there held by one cover member whilst the other cover member is raised for grading inspection without fear of said negative and paper shifting, after which inspection the second cover member is closed.

The disc D is shown in Fig. 3 as mounted on a flange $e$ fixed to a reduced portion $e^1$ of a spindle $e^2$ mounted below in a bearing $e^3$ in the base of the casing A and turning on the point of an adjustable screw $e^4$ extending upwards in said bearing. The latter is secured from below by screws $e^5$ of which one only is shown. There is also provided a disc $e^6$ for securing bearing $e^3$ and avoiding the use of wood screws. This disc is let into a recess in the base of the casing and has an aperture through which adjustment of the screw $e^4$ may be effected. At its upper end the spindle $e^2$ and boss $e$ have bearing in a neck bushing $e^7$ fixed in the top of the casing and to the spindle is adjustably attached a collar $e^8$ on which the bushing $e^7$ bears thus preventing the disc being lifted after adjustment or setting.

When the grading of the negative has been effected as above described the disc D is rotated by means of one or two knobs $f$ extending upwards therefrom through an angle of 180 degrees to bring the negative and paper to the printing position over the printing casing A, in which position it is retained by a spring catch $f^{10}$ carried by the top of the casing A and adapted to engage one or other of two projections $f^1$ extending from the edge of the disc D according to which of the apertures $d$ $d^1$ is opposite said catch.

A key of the controlling device referred to later corresponding to the light intensity required is then operated causing the proper printing light to be produced by the lamp $A^1$ for the determined period, whereby the printing is effected. Whilst this printing is proceeding as at aperture $d^1$ a second negative is being graded at the other aperture $d$ and when the printing is completed and the said lamp extinguished, the disc D is turned through another 180 degrees to bring the first aperture back to its original position where the finished print and negative are removed and replaced by another negative and printing paper (whilst a further negative is being printed) and advantageously placed respectively in trays $g$, $g^1$ shown as located at opposite sides of the grading casing C. A further tray $g^2$ is suitably provided attached at the side of casing A for the store of unprinted negatives. It will be apparent that by the means described a substantially continuous process of grading and printing may be performed.

In the production of photographic prints it is frequently desirable or necessary to use printing papers of different qualities or speeds, such as what are known as "vigorous" and "soft" papers, and a further feature of the invention also provides means for automatically controlling the intensity of the printing light according to the class of paper used by controlling the degree of resistance in the printing lamp circuit, whilst still maintaining the constant period of exposure and the grading control as above described.

For this purpose there is shown provided at one side of the printing casing A a double casing E (Figs. 1 and 2) containing two receptacles $h$, $h^1$, one for "vigorous" papers and another for "soft" papers and each provided with a hinged lid $h^2$, $h^3$ respectively, which on being opened to permit withdrawal of a sheet of paper from the respective receptacle will cause the operation of a switch $i$ (Fig. 3) in the printing lamp circuit to cut out resistance for "vigorous" papers and leave said resistance in (or not cut out so much) for "soft" papers, or vice versa, or whatever other arrangement may be desired so long as the proper light intensity is produced for the different classes of papers.

For this purpose mechanism is used illustrated more particularly in Figs. 4 to 6 from which it will be seen that as one of the lids viz for vigorous paper is raised it will engage a segment $i^1$ fulcrumed at $i^2$ and having its opposite end pivoted to a rod $i^3$ extending downwards between the casings A and E and connected at its opposite end to an arm $i^4$ mounted on the end of a horizontal shaft $i^5$ extending inwards into the casing A. To the segment $i^1$ is attached a lever $i^{15}$ when the operation is to be effected manually. On the shaft $i^5$ inside the casing is a cam $i^6$ under the action of a leaf spring $i^7$ so that as the shaft is rocked by the raising of the lid the cam will be partly rotated and will be held in this position by the spring. The said shaft $i^5$ is mounted at its opposite end in a bearing $i^8$ and carries a fixed collar $i^9$ to which is attached one end of a coiled spring $i^{10}$, the other end of which is attached to a boss $i^{11}$ loosely mounted on the shaft and having an arm $i^{12}$ provided with a laterally extending pin $i^{13}$ adapted to engage one or other of two cam surfaces $j$, $j^1$ carried by a collar $j^2$ fixed to the spindle $e^2$ of disc D. From the said boss $i^9$ extends downward an arm $j^3$ (Fig. 3) carrying an insulated terminal screw $j^4$ for an electric conductor $j^5$ and a contact point $j^6$ adapted to make and break contact with the switch plate $i$ which is in a resistance circuit hereinafter described.

With the parts described the action is such that as lid $h^2$ of the vigorous paper receptacle is raised the lever $i$ will be thrown over, thus forcing downwards the rod $i^3$ and rocking shaft $i^5$ which is held by the cam $i^6$ and spring $i^7$ as explained. At the same time the coiled spring $i^{10}$ will be tensioned and tend to move the arm $i^{12}$ upwards but whilst the disc D is stationary this will be prevented by the pin $i^{13}$ of the arm being arrested by the cam surface $j$ or $j^1$. When however the disc is moved from grading to printing position the pin will be released, thus allowing the arm $i^{12}$ to move upwards under the action of the coil spring $i^{10}$, thereby causing the arm $j^3$ to close the switch $i$ and cut out resistance as hereinafter explained. So long as the lid of the vigorous receptacle is opened these conditions obtain, the pin $i^{13}$ remaining above the cam surface and held there by the spring $i^7$. It is not necessary for the lid to remain open as when once the segment $i^1$ has been pushed over the cam $i^6$ retains the segment $i^1$ in position. The lids may therefore be closed each time after removing a printing paper.

When however the lid $h^3$ of the soft paper receptacle is lifted it will engage the segment $i^1$ and after rotation of the disc D restore the parts to original position with the arm $i^{12}$ and pin $i^{13}$ below the cam surface $j$ or $j^1$ and the coiled spring $i^{10}$ untensioned so that no operation of the switch $i$ takes place and the resistance remains unaffected.

It will thus appear that since the mechanism which controls a lamp circuit lies in the path through which paper is accessible, that the act of an operator passing a sheet of paper through this path automatically causes the lamp circuit to be adjusted to a current supply suitable for the printing characteristics of the selected paper.

From the above description it will be seen that the switch $i$ cannot be closed or opened to cut resistance in or out until the disc D is rotated to bring a negative from printing to grading position in order to ensure that the proper resistance is applied for the printing paper to be applied to the negative to be next printed.

To now refer particularly to the electrical control device for the mechanism above described and illustrated as a whole in Figs. 7 to 14, it will be seen from Figs. 7 to 9 that this control device is arranged in the two casings B and $B^1$ previously mentioned. In the lowermost of said casings $B^1$ is located an electric motor $k$ the shaft $k^1$ of which drives a fan $k^2$ housed in chamber $k^3$ and having an air discharge $k^4$ which extends through the wall of and into the printing casing A for keeping the interior of the latter cool to avoid undue heat generated by the print-lamp $A^1$. The grading casing E is also cooled by the air passing from casing A through apertures $j^{10}$ in the dividing wall masked by baffle plates $j^{11}$ to prevent passage of light. The air is discharged from casing E through any suitable aperture. The said shaft $k^1$ is provided exteriorly of the fan chamber with a worm $k^5$ which meshes with a worm wheel $k^6$ mounted on a cross shaft $k^7$ which in turn is also provided with a worm $k^{17}$ meshing with a worm wheel $k^8$ on a shaft $k^9$. The gearing described is contained in a housing $k^{10}$ attached to the side of the fan chamber and provided with an oil cup $k^{11}$ for lubrication purposes. On the said shaft $k^9$ is mounted a contact drum $l$ having projecting cam segments $l^2$ and $l^3$, the former adapted to close a switch $l^4$ in the lamp circuit and the latter a similar switch $l^5$ in an auxiliary motor circuit, these circuits being hereinafter described in detail in connection with the diagram Fig. 14.

Arranged along the front wall of the upper controller casing B is a series of key switch levers $m$ each shown as identified by a numeral 1 to 10 as indicated in Fig. 10 and corresponding to the degree of light intensity required in the printing lamp $A^1$. The said key levers $m$ extend through slots in the casing wall and are pivoted at the rear of said wall at $m^1$ and each carries a disc $m^2$ having a projection $m^3$ adapted to cooperate with a gravity catch $m^5$ which extends at the rear across the series of keys and to which is attached a plate $m^6$. To said plate $m^6$ is pivoted a rod $m^7$ which extends downwards and has a pin $m^8$ engaging in an inclined slot $m^{18}$ in a plate $m^9$ fulcrumed at $m^{10}$ to a lug extending from the casing wall. The plate $m^9$ has an angular face $m^{11}$ with which there is adapted to engage a nose $l^6$ secured to the side of the drum $l$. Each switch lever $m$ is adapted to be returned to normal or raised position shown in broken lines in Fig. 9 by means of a small tension spring $m^{12}$.

With such a construction a key lever $m$ corresponding to the required light intensity is depressed to the position shown in full lines in Fig. 9 and retained in this condition by the catch $m^5$ co-operating with the projection $m^3$. As the drum $l$ is rotated by the motor $k$ through the gearing described and as the cam segment $l^2$ has released the switch $l^4$ to cause same to open and extinguish the printing lamp as indicated in Fig. 9, the nose $l^6$ will engage the angular face $m^{11}$ of the plate $m^9$ and will raise the latter together with the rod $m^7$, plate $m^6$ and catch $m^5$, thus freeing the lever and allowing it to return to normal position under the action of its spring $m^{12}$.

Should, however, for negatives of extreme density and beyond the ordinary range, it be necessary to give a greater light intensity or printing exposure than that provided by the normal revolution of the drum $l$, the same can be allowed two or more revolutions without tripping the lever $m$ by the following means:—A pull button or knob $n$ is provided on the front wall of the casing having a stem $n^1$ slidable in a neck bushing $n^2$ carried by said wall and carrying at its outer end a wire or thin rod $n^{20}$ the free end of which encircles the aforesaid rod $m^7$. Since the lower end of said rod engages the slot $m^{18}$, when the knob is pulled the inclination of the slot will cause the plate $m^9$ to be swung upwards about its fulcrum, thus removing the face $m^{11}$ from the path of the nose $l^6$ and allowing the drum $l$ to revolve and repeatedly close and open the switch $l^4$ to maintain the printing operation for as long as required until the knob is again pushed in. The knob is retained in its normal position by a disc $n^3$ on the stem $n^1$ engaged by a light spring $n^4$ shown as secured to nut $n^5$ screwed on the neck bushing $n^2$ so that in normal working the pin $m^8$ is retained in the upper end of the slot $m^{18}$ and only a single revolution of the drum $l$ is permitted and consequent tripping of the lever $m$.

The means by which the light intensity of the printing lamp $A^1$ is varied as required will now be described with particular reference to Figs. 10 to 14. As shown in Fig. 13 the key levers $m$ in addition to the projection $m^3$ are each provided with a projection $m^{30}$ which engages an insulated plate $o$ provided with a stud $o^1$ adapted to engage the first of a series of switch contacts $o^2$, $o^3$, $o^4$. The two first contacts $o^2$, $o^3$ are connected to and control the motor circuit and the third contact $o^4$ is connected to and controls the lamp circuit in common with contact $o^2$ whereby on depression of a lever $m$ the motor circuit is closed and the lamp circuit set and the motor started immediately followed by the closing of the lamp circuit by the action of the cam $l^3$ on the revolving drum $l$ and illumination of the printing lamp $A^1$.

Within the upper controller casing B are mounted two resistance coils $p$ and $p^1$ each carried by pins $p^2$ extending inwards from the side walls of the casing.

The lower coil $p^1$ is used for the purpose of controlling the light intensity of the printing lamp $A^1$ under control of the keys $m$ and is divided into sections corresponding to the number of said keys and connections $q$ are made from the contact bands $q^1$ of said coil to terminals $q^{20}$ on insulated bar $q^2$ coupled as by conductors $q^{21}$ (Fig. 13) to the switch contacts $o^4$ above mentioned. Thus when a key lever $m$ is depressed the motor circuit is completed and the lamp circuit set, thus starting the motor. The motor circuit comprises main $r$ (positive) Fig. 14, motor $k$, conductor $r^5$, contact $o^3$, contact $o^2$, and main $r^x$ (negative). The circuit of printing lamp $A^1$ having also been set on common contact $o^2$ and selected contacts $o^4$ and the drum $l$ rotated by the motor, the cam segment $l^2$ on said disc will close the switch $l^4$, thus completing the lamp circuit on one side through switch $l^4$, conductor $r^6$, lamp $A^1$, resistance coil $p$ hereinafter described and main $r$ (positive) and on the other side through switch $l^4$, conductor $r^4$, resistance coil $p^1$, connection $q$ of selected contact $o^4$, contact $o^2$ and main $r^x$ (negative).

On completion of revolution of drum $l$ the key lever $m$ is tripped (except in cases where it is required to continue such revolutions as previously explained) which would break the motor and lamp circuit but before this can take place an auxiliary motor circuit is brought into use in order to carry on for a short time for the purpose of avoiding breaking of the motor and lamp circuits at the key lever contacts $o^2$ to $o^4$ until the catch $m^5$ for the key lever $m$ has released the latter to allow same to return to normal.

This is effected by the cam segment $l^3$ on the contact drum $l$ closing the switch $l^5$ which is in a shunt circuit including motor $k$, main $r$ (positive), conductor $r^5$, conductor $r^{50}$, leading therefrom, and main $r^x$ (negative).

When this auxiliary motor circuit is closed the lamp circuit is first broken at switch $l^4$ and then the motor and lamp circuits are broken at the switch key, the auxiliary motor circuit continuing closed until the release catch $m^5$ is returned to normal position after which said auxiliary motor circuit is broken at the switch $l^5$.

The upper coil $p$ (Figs. 1 and 12) is for the purpose of controlling or varying the resistance for the "vigorous" or "soft" printing papers as previously mentioned and with same are associated two bus bars $p^3$ and $p^4$ co-operating with contact slides $p^5$ and $p^6$ respectively, each provided with a manipulating knob $p^7$, $p^8$ having a pointer $p^9$, $p^{10}$ and working over a graduated scale $p^{11}$ adjustably mounted as by slot and screw connections $p^{12}$ on the top of the casing. The said contact slides are in a circuit including main $r$, conductors $r^1$, slide $p^5$ or $p^6$ resistance cut-out switch $i$ (Fig. 3) previously mentioned, resistance coil $p$, conductor $r^6$, including printing lamp $A^1$, switch $l^4$, conductor $r^4$, and main resistance coil $p^1$ so that according to the manipulation of the contact slides $p^5$ or $p^6$ for soft or vigorous papers respectively a lesser or greater degree of resistance will be cut out for the respective kind of papers and "speeds" thereof.

As will be seen from Fig. 14 the red lamp $C^1$ is in a shunt circuit $t$, $t^1$ taken off the mains $r$, $r^x$ and containing a hand switch $t^2$ shown also in Fig. 10.

The operation of my machine is as follows: An operator places a negative on the glass $d^2$ over the grading lamp $C^1$ and by inspection decides that, as the negative is contrasty a soft grade of paper is necessary. He then opens the hinged cover $h^3$ of the paper receptacle $h^1$ thus causing the cover to strike segment $i^1$, which will through shaft $i^2$, rod $i^3$ and arm $i^4$, turn shaft $i^5$ and with it cam $i^6$ which tends to retain the shaft in a set position through contact with a spring $i^7$. Shaft $i^5$ is thus made to release the tension spring $i^{10}$ thereby causing arm $i^{12}$ and pin $i^{13}$ to lie below the cam $j$ or $j^1$, thus suspending the operation of switch $i$. This cuts out the resistance which is used only with vigorous papers.

After placing the paper on the negative with a suitable mask if desired, the operator turns D by means of a handle $f$ thus bringing the paper and negative into a position in which they may be acted upon by means of the light rays from the printing lamp $A^1$.

As the density of the negative was observed in grading as well as the contrast, the operator pulls down a switch lever $m$ before the negative is printed. This controls the lamp brightness or intensity of the printing lamp, and adjusts it to give the desired exposure. The lamp circuit for lamp $A^1$ is made when key $m$ is depressed and this key closes the motor circuit switch $o^2$ and $o^3$ causing the motor to turn. When the motor turns the lamp circuit is closed by the action of cam $i^3$ on the revolving drum $l$.

While one print is being made a second negative is being graded, so that practically continuous printing operation may take place, the exposure always being automatically terminated at the proper time. Usually the exposures are all of the same duration.

It is possible that one revolution of drum $l$ may not produce the required amount of printing light for an excessively dense negative. In the comparatively rare occurrences where this is true the operator may pull knob $n$ thereby removing face $m^{11}$ from the path of nose $l^6$ and permitting drum $l$ to rotate as long as is necessary. When the exposure has been completed, knob $n$ is pushed in so that the drum $l$ will be stopped in the usual manner.

It is sometimes necessary to adjust the light intensity of the printing lamp $A^1$. For this purpose the coil $p^1$ is used. For varying the resistance for "vigorous" or "soft" printing papers the upper coil $p$ may be used. These adjustments take care of the variations normally occurring in negative densities and the variation in speeds of the printing papers. All exposures, excepting those for extremely dense negatives, are made during the time interval determined by a single revolution of drum $l$.

What I claim as my invention and desire to secure by Letters Patent of the United States is:—

1. In a photographic printing machine, the combination with a casing, of a printing lamp mounted in the casing, means for varying the light intensity of the lamp, receptacles associated with the printer each having an exit for removal of the paper and having a relatively movable part and being adapted to contain printing papers having different printing characteristics, a switch, a circuit connecting the switch to the lamp, said switch being located adjacent said paper receptacles and cooperating with the movable parts of the paper receptacles, said switch being adapted to adjust the light varying means, and being movable by an operator as a sheet of paper is removed from a paper receptacle whereby the printing light is adjusted for the particular characteristics of the selected paper.

2. In a photographic printing machine, the combination with a casing, of a printing lamp mounted in the casing, means for varying the light intensity of the lamp including a plurality of lamp circuits for conveying different amounts of power to the lamp, a plurality of paper receptacles and having movable parts, circuits from the lamp including circuit controls lying adjacent to the movable parts of the receptacles and in paths through which paper is moved from the receptacles, whereby an operator in passing a sheet of paper from a receptacle through the path may move the movable parts to adjust the lamp circuit after contacting with a circuit control so that the lamp may burn with suitable intensity for the selected paper.

3. In a printing machine, the combination with a casing, of a printing lamp mounted therein, a plurality of lamp circuits for furnishing power to the lamp, a circuit control member connected to the circuits by which the different circuits may be selected to cause the lamp to burn with different light intensities, paper receptacles associated with the printer, movable members lying in the paths through which the paper is accessible, connections between these movable members and the circuit control whereby the members lying in the paths may be actuated by an operator selecting a sheet of paper so as to position the circuit control member, causing the lamp circuit to be furnished with current necessary for the desired light intensity for the selected paper.

4. In a printing machine, the combination with a casing, of a printing lamp mounted therein, a plurality of lamp circuits for furnishing power to the lamp, a circuit control member connected to the circuits by which the different circuits may be selected to cause the lamp to burn with different light intensities, paper receptacles associated with the printer, members carried by the paper receptacles lying across the paths through which paper is accessible, said members being adapted to move the circuit control member, whereby the operation of removing a sheet of paper from a receptacle through a path will automatically adjust the lamp brightness for the selected paper.

5. In a printing machine, the combination with a casing, a lamp mounted therein, a plurality of lamp circuits, a selector switch for causing a circuit to be adjusted for furnishing power to the lamp, a plurality of paper receptacles corresponding in number to the number of lamp circuits, and mechanism cooperating with the paper receptacles and lying in the paths of access to the paper in the receptacles adapted to move the selector switch whereby the lamp brilliance is selected by removing a sheet of paper through a path from a receptacle.

6. In a printing machine, the combination with a casing, a lamp mounted therein, a plurality of lamp circuits, a selector switch for causing a circuit to be adjusted for furnishing power to the lamp, a plurality of paper receptacles adapted to contain printing paper, a plurality of covers hinged to the receptacles being adapted when swung about their hinges to move the selector switch whereby the selector switch may be moved by a cover of a paper receptacle to adjust the lamp circuit for the lamp brightness fitted to the printing paper contained in the receptacle.

7. In photographic printing apparatus, the combination of two apertured chambers, a source of printing light in one chamber and a source of grading light in the other chamber each adapted to emit light through the apertures, a rotatable support also having apertures across which negatives and associated printing papers are adapted to be placed and means for rotating the support to bring the apertures thereof into relation with the apertures of the receptacles whereby one negative may be graded whilst the other is printed.

8. In photographic printing apparatus, the combination of two apertured chambers, a source of printing light in one chamber, and a source of grading light in the other chamber each adapted to emit light through the apertures, a rotatable support also having apertures across which negatives and associated printing papers are adapted to be placed, means for rotating the support to bring the apertures thereof into relation with the apertures of the receptacles whereby one negative may be graded whilst the other is printed, and means for imparting varying degrees of intensity to said printing light.

9. In photographic printing apparatus, the combination of a chamber having an aperture, a source of printing light therein adapted to emit light through said aperture, means for varying the intensity of said printing light, a rotary support having an aperture across which a negative and associated printing paper may be placed, and means for rotating said support to bring the aperture thereof into and out of register with the aperture of the aforesaid chamber.

10. In photographic printing apparatus, the combination of a chamber having an aperture, a source of printing light therein adapted to emit light through said apertures, means for imparting varying degrees of intensity to said printing light, a second chamber also having an aperture, a source of grading light in said second chamber adapted to admit light through its aperture, and a rotary support adapted to support negatives and associated printing papers at diametrically opposite positions, said support being rotatable to bring one negative in operative relation to the printing light whilst the other is in operative relation to the grading light.

11. In photographic printing apparatus, the combination of a chamber containing a source of printing light and having a hinged wall, a second casing attached to said hinged wall and containing a source of grading light, a rotary support above said casings, means on said support for clamping negatives and associated printing papers thereon and means for rotating said support to bring one negative in operative relation to the printing light whilst the other is in operative relation to the grading light.

12. In a photographic printing apparatus, the combination with two adjacent chambers, of a source of printing light in one chambers, a source of grading light in the other chamber, a support for negatives and printing papers, a movable carrier therefor adapted to move the supports into operative relation with the printing or grading lights, a plurality of receptacles for printing papers of different printing characteristics, and means including a plurality of lamp circuits, a selector switch and means for operating the switch adapted to vary the intensity of the printing light, said switch operating means being positioned in the path of access to the printing papers in the receptacles.

13. In photographic printing apparatus, the combination of two adjacent chambers, a source of printing light in one chamber, a source of grading light in the other chamber, a rotary carrier, a support for negatives and associated printing papers mounted thereon and adapted for rotatory movement to bring one negative and paper in operative relation to the printing light whilst another negative and paper is in operative relation to the grading light, means for imparting variable intensity to said printing light according to different densities of the negatives, a plurality of receptacles adjacent said chambers adapted for reception of printing papers of different character, movable lids for said receptacles, and means actuated by said lids for further controlling the intensity of the printing light according to the character of printing paper removed from said receptacles.

14. In a photographic printing apparatus, the combination with two adjacent chambers, of a source of printing light in one chamber, a source of grading light in the other chamber, a support for negatives and printing papers, a movable carrier therefor adapted to move the supports into operative relation with the printing or grading lights, a plurality of receptacles for printing papers of different printing characteristics, and means including a plurality of lamp circuits, a selector switch and means for operating the switch adapted to connect the lamp with a selected circuit, and means including the movable carrier for passing current through the selected circuit to the lamp.

15. In photographic printing apparatus, the combination of two adjacent chambers, a source of printing light in one chamber, a source of grading light in the other chamber, a rotary carrier, a support for negatives and associated printing papers mounted on the carrier and adapted for rotatory movement to bring one negative and paper in operative relation to the printing light whilst another negative and paper is in operative relation to the grading light, means for imparting variable intensity to said printing light according to different densities of the negatives, a plurality of receptacles adjacent said chambers adapted for reception of printing papers of different character, movable lids for said receptacles, and means actuated by said lids and controlled as to time of operation by the rotation of the support for varying the intensity of the printing light according to the character of the printing paper removed from said receptacles.

16. In photographic printing apparatus, the combination of a chamber having an aperture, a source of grading light therein adapted to emit light through said aperture, a rotary support having apertures therein across one of which a negative and associated printing paper may be placed in relation to said grading aperture and means for holding said negative and printing paper comprising a bipartite spring pressed cover for each support aperture, one part being adapted to be opened whilst the other part retains the negative and printing paper in position relatively to its aperture.

17. In photographic printing apparatus, the combination of two adjacent chambers each having an aperture through which printing and grading lights are emitted, a rotary support having apertures corresponding to those of the chambers and across each of which a negative and associated printing paper may be placed and means for holding said negatives and paper in position in relation to the support apertures comprising for each a bipartite cover, and spring means for separately closing the parts of said cover, said parts being capable of independent opening and closing movements.

18. In photographic printing apparatus, the combination of a chamber containing a source of printing light and having a hinged wall and constituting a casing, a second casing attached to said hinged wall and containing a source of grading light, a rotary support above said casings, means on said support for clamping negatives and associated printing papers thereon, means for rotating said support to bring one negative in operative relation to the printing light whilst the other is in operative relation to the grading light, a receptacle attached to one casing for untreated negatives, and receptacles attached to the other casing in spaced relation for treated negatives and finished prints.

19. In photographic printing apparatus the combination of a chamber containing a source of printing light and having a hinged wall and constituting a casing, a second casing attached to said hinged wall and containing a source of grading light, a rotary support above said casings, means on said support for clamping negatives and associated printing papers thereon, means for rotating said support to bring one negative in operative relation to the printing light whilst the other is in operative relation to the grading light, a plurality of receptacles associated with said chambers for reception of printing papers of different classes, a receptacle attached to one chamber for unprinted negatives, and receptacles attached to the other casing in spaced relation for printed negatives and finished prints respectively.

20. In photographic printing apparatus, the combination of a chamber containing a source of printing light and having a hinged wall and constituting a casing, a second casing attached to said hinged wall and containing a source of grading light, a rotary support above said casings, means on said support for clamping negatives and associated printing papers thereon, means for rotating said support to bring one negative in operative relation to the printing light whilst the other is in operative relation to the grading light, means for varying the intensity of the printing light according to the density of the negatives to be printed, a plurality of receptacles associated with said chambers for reception of printing papers of different character and means for further varying the intensity of the printing light according to the character of the printing paper withdrawn from said receptacles.

21. In photographic printing apparatus, the combination of a source of printing light, a source of grading light, means including a movable carrier and a support for moving a negative and associated printing paper to positions to be alternately exposed to one or the other of said sources of light, means for imparting varying degrees of intensity to said printing light according to the density of the negatives and means for imparting a constant period of exposure to the negatives by said printing light.

22. In photographic printing apparatus, the combination of a source of printing light, a source of grading light, means including a movable carrier and a support for moving a negative and associated printing paper to positions to be alternately exposed on one or the other of said sources of light, key-controlled means for imparting varying degrees of intensity to said printing light according to the density of the negatives and means for imparting a constant period of exposure to the negatives by said printing light.

23. In photographic printing apparatus, the combination of a source of printing light, a source of grading light, means including a movable carrier and a support for moving a negative and associated printing paper to positions to be alternately exposed to one or the other of said sources of light, means for imparting varying degrees of intensity to said printing light according to the density of the negatives, means for imparting a constant period of exposure to the negatives by said printing light, and means for disabling said latter means to permit indefinite period of exposure at will.

24. In photographic printing apparatus, the combination of a source of printing light, a source of grading light, a pair of supports for negatives and associated printing papers, a rotatable carrier for the supports adapted for manual movement to bring one negative in operative relation to said printing light whilst the other is in similar relation to the grading light, key-controlled means for imparting varying degrees of intensity to said printing light according to the density of the negatives, motor driven means for imparting a constant period of exposure to the negatives by said printing light and connections between the motor driven means and the key controlled means for restoration of the keys to normal position after operation and for stopping the motor.

25. In photographic printing apparatus, the combination of a source of printing light, a source of grading light, two supports for negatives and associated printing papers, a rotatable carrier for the two supports adapted for manual movement to bring one negative in operative relation to said printing light whilst the other is in similar relation to the grading light, key-controlled means for imparting varying degrees of intensity to said printing light according to the density of the negatives, motor driven means for imparting a constant period of exposure to the negatives by said printing light and manually operated means for disabling said motor driven means to permit indefinite periods of exposure at will.

26. In photographic printing apparatus, the combination of two adjacent casings one containing a printing light and the other a grading light, a plurality of supports for negatives and associated printing papers, a rotatable carrier for the supports adapted for rotation to bring one negative to printing position whilst another is at grading position, means for varying the intensity of the printing light according to the density of the negatives, other means for varying the intensity of the printing light according to the character of the printing paper used, and means for controlling the period of exposure of the negative to the printing light to ensure constant exposure of successive negatives brought to the printing position after removal from the grading position.

27. In photographic printing apparatus, the combination of two adjacent casings one containing a printing light and the other a grading light, a plurality of supports for negatives and associated printing papers, a rotatable carrier for the supports adapted for rotation to bring one negative to printing position whilst another is at grading position, receptacles adjacent the chambers for reception of printing papers of different character, a controlling device associated with the chambers and comprising a motor, a variable resistance coil, key-controlled connections in circuit with the motor and the printing light adapted to start the operation of the motor and determine the degree of resistance cut out from the coil according to the key actuated, a contact-drum driven from the motor and adapted to determine the period of operation of the motor and illumination of the printing light, a second resistance coil, a cut-out switch in circuit therewith and means for controlling the operation of said switch by the rotation of the support and the withdrawal of printing paper from said receptacles.

28. In photographic printing apparatus the combination of a source of printing light, a source of grading light, a movable carrier, a support carried thereby, for a negative and associated printing paper, means for moving the carrier and support to positions to be alternately exposed to one or the other of said sources of light, means for imparting varying degrees of intensity to said printing light according to the density of the negatives and manually operated means for varying the intensity of the printing light according to the character of the printing paper used.

In witness whereof I have signed this specification.

HENRY VASSAR LAWLEY.